10/22/85 XR 4,548,379

United States Patent [19]

Seely et al.

[11] Patent Number: 4,548,379

[45] Date of Patent: Oct. 22, 1985

[54] COMPACT SIGN AND STAND

[75] Inventors: James R. Seely, Rochester; Cecil E. Ursprung, Ann Arbor, both of Mich.

[73] Assignee: Marketing Displays, Inc., Farmington Hills, Mich.

[21] Appl. No.: 442,418

[22] Filed: Nov. 17, 1982

[51] Int. Cl.[4] F16M 13/00

[52] U.S. Cl. 248/624; 40/602; 40/608; 40/611; 248/160; 248/170

[58] Field of Search 248/160, 170, 166, 161, 248/624, 407, 599, 600, 601, 354.5, 125, 124, 122, 121; 40/602, 606, 607, 608, 611, 612; 292/219, 228; 403/108, 109, 330, 395, 398, 399

[56] References Cited

U.S. PATENT DOCUMENTS

| | | | |
|---|---|---|---|
| 1,420,268 | 6/1922 | LaHodny . | |
| 1,764,071 | 7/1930 | Foulke . | |
| 1,854,478 | 4/1932 | Meyers . | |
| 1,972,959 | 9/1934 | Taylor . | |
| 2,167,564 | 7/1939 | Fonda | 248/407 X |
| 2,172,282 | 9/1939 | Hopp . | |
| 2,592,386 | 4/1952 | Breakey . | |
| 2,719,688 | 10/1955 | Seifert | 248/188.5 |
| 2,815,594 | 12/1957 | Heselov . | |
| 2,847,776 | 8/1958 | Robertson . | |
| 2,849,202 | 8/1958 | McCombs | 248/188.5 X |
| 3,164,354 | 1/1965 | Murdock . | |
| 3,171,179 | 3/1965 | Lee . | |
| 3,256,594 | 6/1966 | Howard et al. . | |
| 3,287,840 | 11/1966 | Keats | 40/607 X |
| 3,310,901 | 3/1967 | Sarkisian . | |
| 3,384,348 | 5/1968 | Wicker . | |
| 3,458,945 | 8/1969 | Edwards . | |
| 3,521,390 | 12/1969 | Carlson . | |
| 3,526,200 | 9/1970 | Doyle | 40/606 X |
| 3,535,807 | 10/1970 | Baldwin . | |
| 3,620,496 | 11/1971 | Boh et al. . | |
| 3,646,696 | 3/1972 | Sarkisian . | |
| 3,662,482 | 5/1972 | Sarkisian . | |
| 3,683,527 | 8/1972 | Gilman . | |
| 3,899,843 | 8/1975 | Doyle et al. | 40/612 X |
| 3,910,614 | 10/1975 | Coe | 292/219 |
| 4,033,536 | 7/1977 | Hillstrom . | |
| 4,265,040 | 5/1981 | Sarkisian . | |
| 4,288,053 | 9/1981 | Sarkisian . | |
| 4,368,586 | 1/1983 | Forzelias . | |
| 4,433,935 | 2/1984 | Main et al. | 248/125 X |

FOREIGN PATENT DOCUMENTS

| | | | |
|---|---|---|---|
| 0078520 | 5/1983 | European Pat. Off. . | |
| 1269369 | 5/1968 | Fed. Rep. of Germany | 248/121 |
| 768730 | 2/1934 | France | 40/607 |
| 1289175 | 5/1961 | France | 403/108 |
| 1286852 | 1/1962 | France . | |
| 72532 | 9/1947 | Norway . | |
| 323967 | 1/1930 | United Kingdom . | |
| 1117283 | 6/1968 | United Kingdom . | |
| 1267932 | 3/1972 | United Kingdom . | |
| 1311582 | 3/1973 | United Kingdom . | |
| 1404624 | 9/1975 | United Kingdom . | |
| 2023694A | 1/1980 | United Kingdom . | |
| 1601142 | 10/1981 | United Kingdom . | |

*Primary Examiner*—J. Franklin Foss
*Assistant Examiner*—David L. Talbott
*Attorney, Agent, or Firm*—Harness, Dickey & Pierce

[57] ABSTRACT

An improved compact warning sign and stand are disclosed which include apparatus for attaching and retaining the sign to an upstanding frame member of the stand. The preferred attachment apparatus includes a pair of channels on each of opposite sides of the frame member into which a vertical cross-brace on the sign may be inserted. The preferred frame member also includes means for permitting the sign panel to laterally pivot or swing under side-wind loads in order to allow a resilient portion of the frame base to deflect generally along a predetermined plane, thereby substantially preventing the sign and stand assembly from tipping over.

20 Claims, 8 Drawing Figures

FIG. 4.
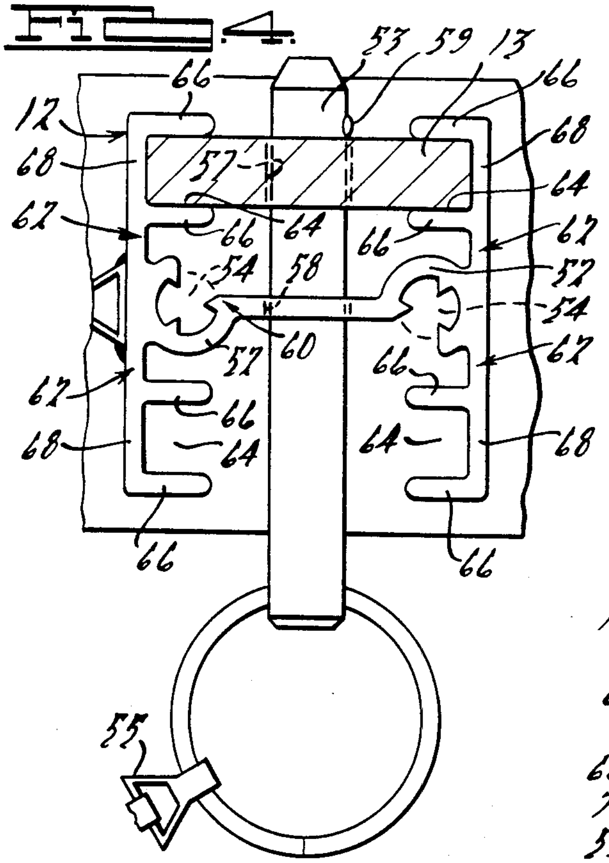
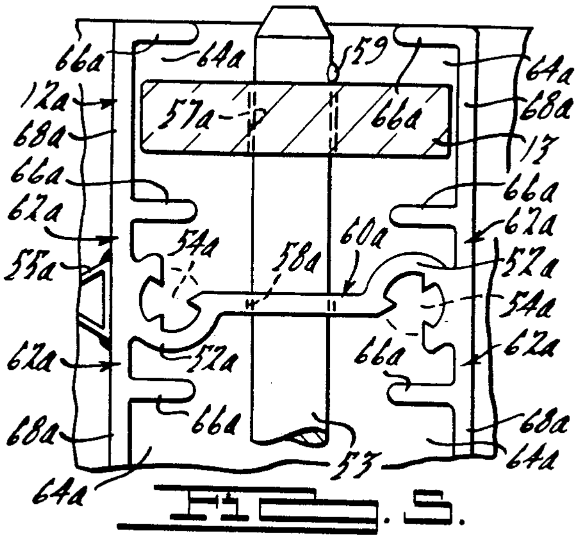
FIG. 5.
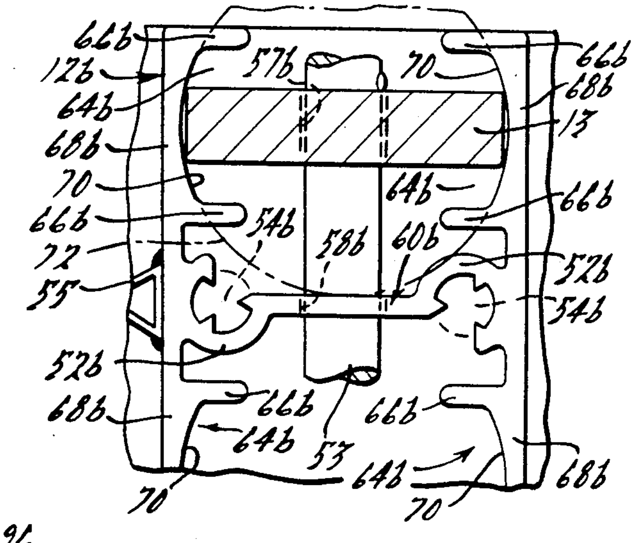
FIG. 6.
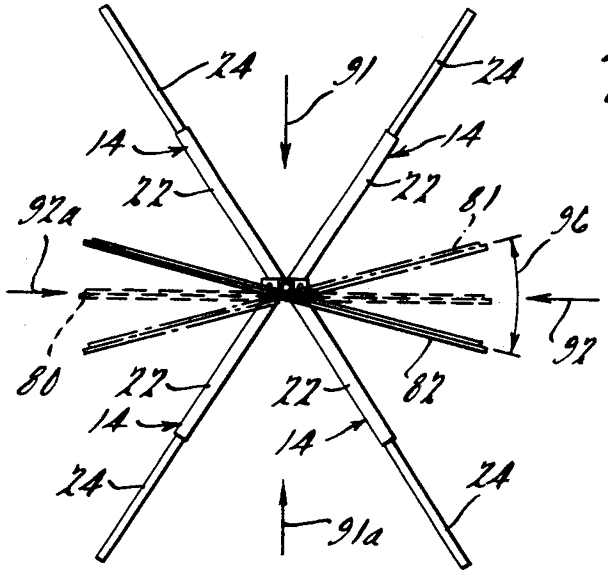
FIG. 7.
FIG. 8.
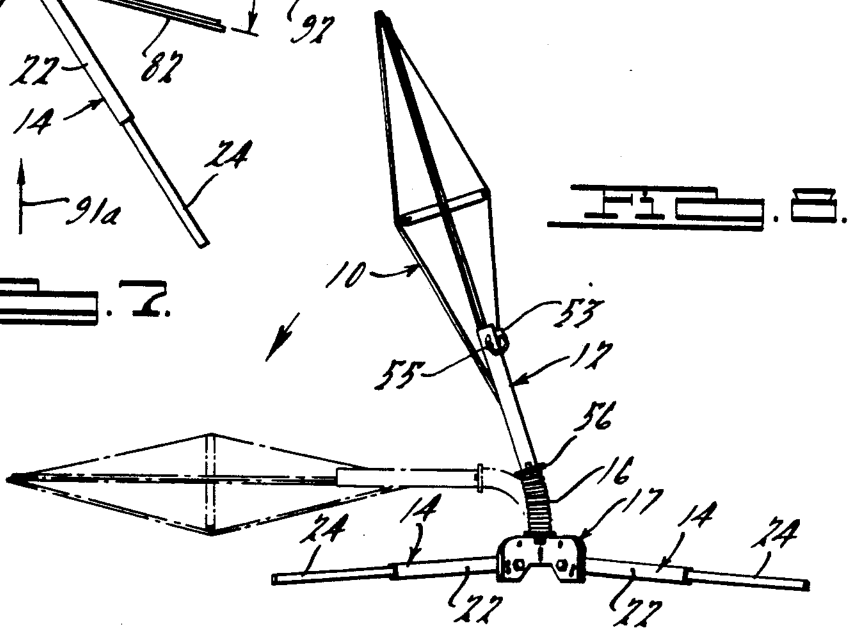

COMPACT SIGN AND STAND

BACKGROUND AND SUMMARY OF THE INVENTION

The present invention relates to signs and stand devices for displaying warnings or other pertinent information, particularly in emergency situations. The invention more specifically relates to such signs and stand devices that are light-weight and may be folded or retracted into a compact structure for transportation or storage.

Compact, light-weight, easily portable and easily assemblable warning devices are a necessity for emergency use. At accident scenes, for example, police and other emergency vehicles need to provide a warning to other traffic approaching the accident, slow that traffic down, and direct it safely around the accident site. The warning devices should be small enough to fit easily in the emergency vehicle without taking up too much space and yet be large enough in use to be seen easily by other motorists. It is also imperative that the warning devices be usable at all times regardless of weather conditions. For obvious safety reasons, the warning devices should not blow over or slide to undesired locations (such as into traffic) in high winds.

The ability of the emergency warning device to be sufficiently large in use to be readily visible to oncoming motorists is an especially important consideration. Vehicles arriving at or passing by an accident or emergency site create an extremely dangerous hazard to emergency and accident personnel at the scene, as well as to the emergency vehicles parked nearby. As to the latter point, a large number of police vehicles are stuck and damaged each year at accident sites by approaching cars and other vehicles which were not adequately warned about the accident ahead of them.

Numerous sign stands are known today which are used for supporting various signs for providing messages, warnings, advertisements, or other pertinent information to the public, particularly along construction sites or at business establishments. These signs are typically positioned on sign standards that are either anchored in the ground, held in place by sandbags or other heavy objects, or spring-mounted on bases which allow them to bend or deflect, without tipping over, under high wind forces. Spring-mounted sign stands which can be used for this purpose are shown in U.S. Pat. Nos. 3,646,696; 3,662,482; 4,033,536; 4,256,040; and 4,288,053; as well as in two copending patent applications entitled "Improved Sign Bracket", and "Improved Deflectable Sign And Stand", filed on the same date as the present application, and in a previously-filed copending patent application, Ser. No. 274,400, filed June 17, 1981, all three of said copending applications being assigned to the same assignee as the invention herein. Such spring-mounted sign stands, although they are unanchored, transportable and capable of use regardless of weather conditions, are relatively large in size and would take up too much space in emergency vehicles. Also, known sign stands have sign mounting mechanisms which are not necessarily designed for the immediate and simple mounting needed in emergency-type situations.

Typically, the signs commonly used at construction sites are made of metal or wood and are bulky and heavy. As a result, such signs are not well-suited for compact storage and transportation, such as in a police or other emergency vehicle. In order to provide a lighter and more easily transportable display, signs have been developed which are made out of a heavy-duty flexible material, such as reinforced cloth, vinyl, or plastic. Such signs are lighter and easier to handle than the prior metal or wood signs and are also typically adapted to be rolled-up or folded-up for ease of transportation and storage. These roll-up signs typically have one or more substantially rigid cross-braces to hold them in their fully extended configurations, with brackets or other mounting means on the sign stands for holding the signs in place. Many of the brackets presently in use for mounting or attaching such signs to the sign stands, however, are often difficult and time-consuming to operate, and typically are relatively heavy and bulky, thereby making them inconvenient for use with emergency vehicles. For emergency use, it is often necessary that the warning devices be adapted to be set up and made operational with as little difficulty and as quickly as possible.

It is an object of the present invention to provide an improved light-weight, foldable and compact sign stand for holding and securing signs thereto, thereby facilitating the convenient storage and transportation of the sign and stand components. It is a further object to provide a sign stand that has the particular capability of quick and easy mounting or attachment of a roll-up or other flexible-type sign on the frame member of the sign stand.

In accordance with the invention, a sign stand for a sign having a flexible sign panel and a sign mounting member or cross-brace thereon generally includes a base, an upstanding frame member, means for connecting the frame member to the base, and means for attaching the sign's mounting member to the frame member. The stand base preferably includes a plurality of telescoping legs or other ground-engaging means that may be selectively retracted into a shortened configuration or extended into an elongated configuration. The legs are also pivotally attached to the stand base assembly so that they may be folded upwardly to a position generally adjacent and parallel to the frame member for transportation or storage or folded downwardly to a ground-engaging position generally perpendicular to the frame member. Preferably, the frame member and base, when combined, are approximately the same length as the shortened legs so that when retracted and folded upwardly, the legs form a compact package with the frame and base for ease and convenience of storage.

The upstanding frame member preferably includes means for being resiliently deflected, relative to the base assembly, generally along a predetermined plane in response to wind forces which are generally directed transverse to the plane of the sign panel. The sign attachment means in the preferred embodiment is adapted to permit the sign panel to pivot or swing laterally about a generally vertical axis in response to side-wind forces directed generally parallel to the plane of a sign. Such pivotal or swinging movement of the sign panel allows the wind to produce a force on the sign panel generally transverse to the side-wind forces and allows the frame member to more easily pivotally deflect along the above-mentioned predetermined plane, thereby insuring against tipping over of the sign stand.

Other objects, features and advantages of the present invention will become apparent from the following description and claims taken in conjunction with the accompanying drawings.

BRIEF DESCRIPTION OF THE DRAWINGS

FIG. 4 is a cross-sectional view taken along the plane of section line 4—4 of FIG. 1.

FIG. 5 is a cross-sectional view similar to that of FIG. 4, but illustrating another embodiment of the present invention.

FIG. 6 is a cross-sectional view similar to that of FIG. 4, but illustrating still another embodiment of the present invention.

FIG. 7 is a top view of the sign and stand assembly of the present invention, illustrating the lateral pivotal or swinging movement of the sign.

FIG. 8 is a side view of the sign and stand assembly of the present invention, illustrating the frame member in a partially downwardly-deflected position.

DETAILED DESCRIPTION OF THE PREFERRED EMBODIMENTS

Figure 1:
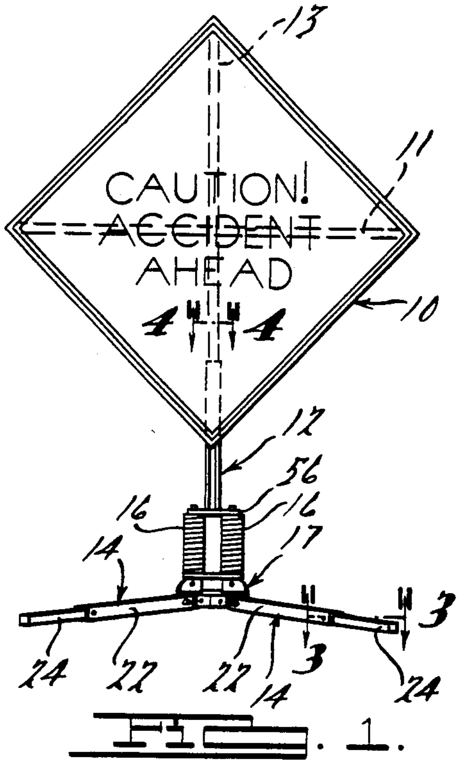
FIG. 1 is a front view of a warning sign and stand.

The drawings show merely exemplary embodiments of the preferred invention for purposes of illustration only. One skilled in the art will readily recognize that the principles of the invention are well-adapted for application to devices other than sign and stand assemblies as well as to sign and stand assemblies other than those shown in the drawings.

FIG. 1 illustrates the invention in use near an accident scene for providing a warning to on-coming motorists. A warning sign 10 is mounted or attached to a relatively short upright sign frame or pole 12, and the frame 12 is supported on the ground by a plurality of ground-engaging legs 14. A pair of coil springs 16 interconnect the frame 12 with a base assembly 17 and allow the sign 10 and frame 12 to deflect downwardly when subjected to wind forces and then to return to their normal upright positions shown in FIG. 1. Spring-mounted sign stands which function as described above are disclosed in the above-mentioned U.S. patents and copending applications. It should be understood, of course, that the sign attachment means described below may also be used with other types of sign stands or frame members, whether permanently anchored or portable, and whether spring-mounted or rigidly mounted.

Figure 2:
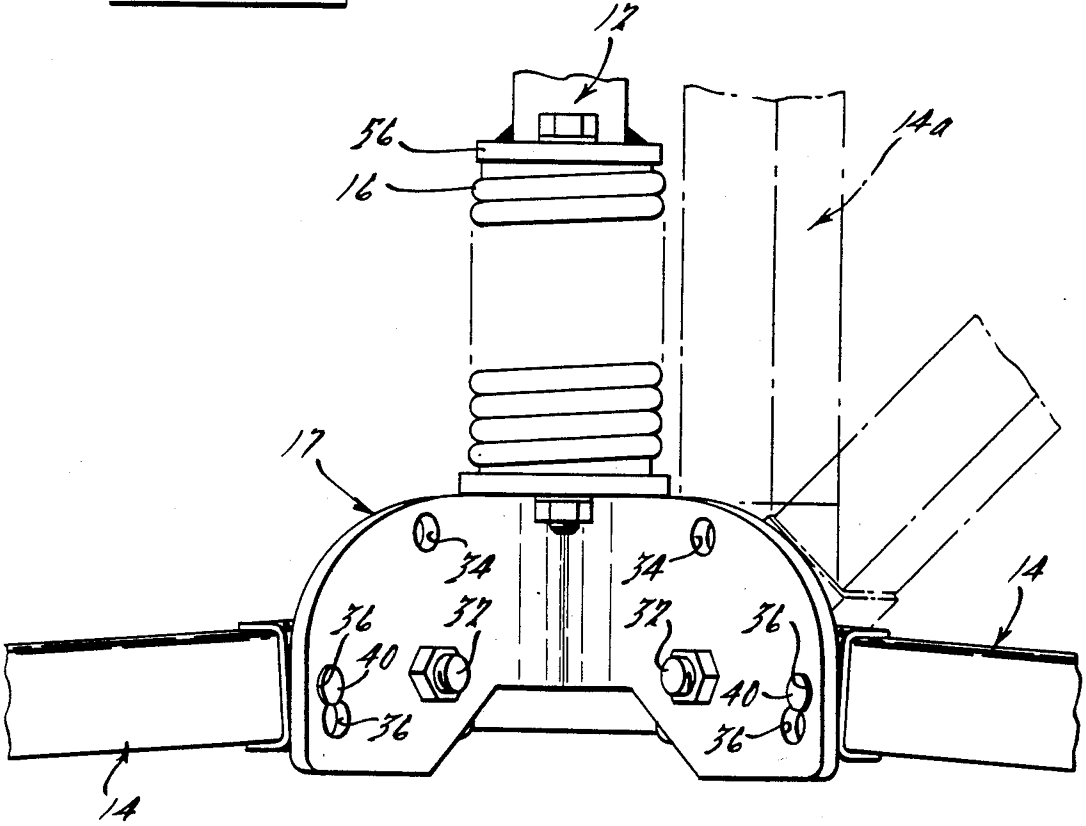
FIG. 2 is an enlarged side view of the base assembly portion of the sign and stand assembly shown in FIG. 1.

The ground-engaging legs 14 are preferably telescopic and include two sections, a smaller slidable section 24 slidably received within a larger sleeve-type outer section 22. The slidable section 24 is adapted to slidably extend and retract inside the sleeve-type section 22 so that the legs 14 may be extended to support the sign and stand assembly or may be retracted to approximately one-half their fully-extended length for ease and convenience of transportation and storage. Furthermore, as illustated in FIG. 2, the legs 14 are pivotally attached to a base member 30 of the base assembly 17 by means of a pivot pin 32 extending therethrough. Thus, the legs 14 may be folded downwardly to a ground-engaging position generally perpendicular to the frame 12 or upwardly to a folded position, indicated by reference numeral 14*a*, wherein the legs are generally adjacent and parallel to the frame 12. A spring-loaded locking pin 40 resiliently attached to the inner ends of the legs 14 may be inserted into upper apertures 34 on the base member 30 to retain the legs in their upwardly-folded position. Similarly, the locking pin 40 may be inserted in the lower apertures 36 in the base member 32 to retain the legs 14 in their downwardly-folded ground-engaging position. Preferably, the frame 12, the springs 16, and the base 17 should have a combined length approximately equal to the length of the legs 14 when they are retracted inwardly and folded upwardly adjacent the frame 12, thereby facilitating ease and convenience of storage.

Figure 3:
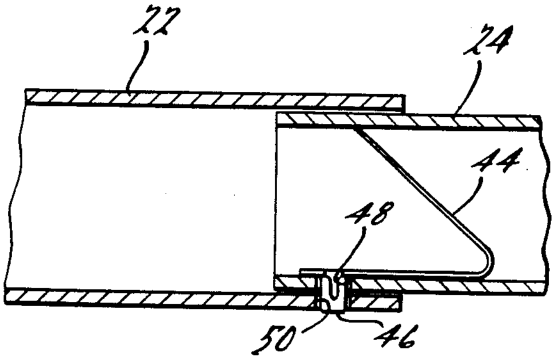
FIG. 3 is a cross-sectional view taken along the plane of section line 3—3 of FIG. 1.

As is shown in FIG. 3, the telescoping sections 22 and 24 of the legs 14 include detent means for releasably holding the legs in their outwardly or fully extended positions. Such detent means may comprise any of a number of mechanisms well-known to those skilled in the art. An example of such a mechanism is illustrated by the preferred arrangement shown in FIG. 3, wherein a bent and biased spring detent member 44 is resiliently inserted inside each of the leg sections 24. The detent member 44 has a protrusion 46 which is adapted to resiliently protrude through aperture 48 in the side wall of leg section 24 and to seat in a corresponding aperture 50 in the side wall of the leg section 22. At rest, that is when the slidable leg section 24 is in a fully retracted position inside the sleeve leg section 22, the outwardly-biased protrusion 46 rests against the inside surface of the leg section 22. When the leg section 24 is slidably extended from the leg section 22, the protrusion 46 slides in contact with such inner surface of leg section 22 until it mates with and protrudes partially into the aperture 50 adjacent the outer end of leg section 22. In this manner, the legs 14 can be "locked" in their fully-extended positions. As is evident from this description, the legs can be telescoped inwardly to form a compact package for storage and when needed can be quickly and easily extended to their full lengths for convenient set up and use of the sign stand.

The sign 10 includes a large flexible panel with a warning message or symbol on one side and a pair of cross-braces 11 and 13 pivotally attached to one another on the other side. The cross-braces are made of a fiberglass or similar material, are relatively rigid in order to brace and support the flexible sign panel in its fully extended position, and yet are sufficiently flexible to be twisted to allow lateral movement of the sign as discussed hereinafter. As shown in FIG. 1, the cross-brace 11 is situated ina horizontal position when the sign is mounted on the frame 12, while the other cross-brace 13 is vertically situated and retained by the frame 12 as described below. Any of several attaching means known in the art may be used to retain the corners of the sign at ends of the cross-braces 11 and 13 in order to erect the sign to its display configuration. When the sign 10 is removed from the frame member 12 and is to be taken down, at least two of the corners of the flexible sign panel material are detached from the ends of their corresponding cross-brace, and the cross-braces are pivoted to a generally parallel, mutually-aligned relationship. The flexible sign panel, which remains attached to one of the cross-braces, may then be folded or rolled up around the mutually-aligned cross-braces for compact, convenient storage.

As is illustrated in FIGS. 4 through 6, the frame 12 is preferably an extruded member having a predetermined cross section. The frame 12 may be composed of any conventional material that is sturdy enough to be used for the purpose described herein, but is preferably composed of a metal, such as light-weight extruded aluminum, for example. Frames made from such extruded aluminum material have provided very satisfactory performance.

The cross-sectional shape of the frame 12, as shown in FIG. 4, includes a central support member 60 and a pair of symmetrical flanges 62 protruding in opposite directions on each end of the central support member 60. The outermost ends of the flange members 62 each include a generally U-shaped channel 64. The channels 64 are identical, but symmetrically opposite, and are each formed by a pair of generally parallel channel legs 66 interconnected by a channel base 68. Preferably, in the embodiment shown FIG. 4, the width of the space between the corresponding channel legs 66 is such that the vertical cross-brace 13 may be slidably and interferingly inserted into the pair of channels 64 on either of the opposite sides of the frame 12 in order to be frictionally attached and retained therein. Such a symmetrically opposite sign attachment configuration allows the warning sign 10 to be very quickly erected and attached to the frame 12 merely by frictionally inserting the vertical cross-brace 13 within the pair of channels 64 on either of the identical sides of the frame 12. Therefore, no matter which of the opposite sides of the frame is oriented toward on-coming traffic when the stand is set-up, the user may quickly erect and display the warning sign without having to reorient the sign stand assembly. Of course, it is also possible to, if desired, provide a frame 12 with just one pair of channels 64 on only one side of the frame 12 in accordance with the present invention.

Referring to both FIGS. 1 and 4, it should be noted that only a relatively short portion of the lower end of the vertical cross-brace 13 is inserted into, and frictionally engaged by, the frame 12. Thus enough of the cross-brace 13 is engaged by the frame 12 to securely mount the sign 10 thereon, but a relatively large vertical portion of the cross-brace 13 is left unsecured by the frame 12. Such unsecured portion of the cross-brace 13 is sufficiently long that it may resiliently and torsionally twist under the influence of side-directed wind loads as is explained more fully later in this description.

Because of the relative short length of the cross-brace 13 that is frictionally secured to the frame 12, a hitch pin 53 may optionally be attached to the frame 12 by a chain 55 for insertion through apertures 57 and 58 in the cross-brace 13 and the frame 12, respectively. Although use of such a hitch pin may not be necessary in most instances to insure retention of the cross-brace in the frame member channels, it may be deemed desirable or necessary in particular applications of the invention. If included on frame 12, however, the hitch pin 53 preferably includes a spring-loaded detent means 59 at its free end for substantially preventing the hitch pin from vibrating loose or otherwise slipping or working free from its engagement with the cross-brace 13 and the frame 12. The hitch pin and its related apparatus are described in more detail below in connection with the discussion of FIG. 5.

Preferably, the frame 12 also includes a pair of base attachment receptacles 52 on at least one side of the central support member 60. The base attachment receptacles 52 are preferably extruded integrally with the frame 12 and are adapted to receive fasteners 54 extending upwardly through an upper plate 56 for securing the frame 12 to the coil springs 16. The fasteners 54 are preferably self-tapping screws that threadably and frictionally engage the sides of the base attachment receptacles 52 and are long enough to adequately support the frame 12.

The coil springs 16 on the frame 12 provide a resilient connection between the frame and the base assembly 17 such that the frame 12 is resiliently deflectable generally along a predetermined plane, which is generally perpendicular to the plane of the sign 10 when the sign is in its normal orientation 80 as shown in FIG. 7. In use during high wind forces, the spring mounted sign stands in accordance with the above-mentioned patents and co-pending applications can deflect to a point where the plane of the sign is generally parallel to the ground. Regardless of the amount of deflection, the sign resiliently returns to its upright position when the wind forces subside.

In most cases during use, the deflection of the sign occurs in response to wind forces that are exerted on the sign in a direction generally transverse to the plane of the sign panel, such as those illustrated by reference numerals 91 or **91*a* in FIG. 7, for example. It should be understood, however, that such transversely-directed wind forces need not be exerted in a direction perpendicular to the plane of the sign when in its normal sign orientation 80 in order to cause such deflection of the coil spring 16. It is sufficient merely that such transversely-directed forces have enough of a force vector component in a direction perpendicular to the normal sign orientation 80 such that the coil springs 16** may be caused to deflect.

In order to insure that the sign and stand assembly will remain stable in side-wind load situations, such as in response to second wind forces 92 or **92*a* exerted on the sign in a direction generally parallel to the normal sign orientation as shown in FIG. 7, the frame 12 shown in FIG. 4, and the alternate frames 12*a* and 12*b*, shown in FIGS. 5 and 6, and discussed below, include means for allowing the sign panel to pivot or swing laterally about a generally vertical axis. Such capability allows the pivoted sign to assume sign orientations such as those illustrated by reference numerals 81 and 82 in FIG. 7**, which in turn allow the stand to pivot and deflect along the above-mentioned predetermined plane as is more fully explained below.

In the embodiment of the invention illustrated in FIG. 4, the capability of allowing the sign panel to pivot or swing laterally is provided by the above-discussed unsecured portion of the cross-brace 13. Such unsecured portion is sufficiently long and sufficiently flexible to torsionally twist about a generally vertical axis in response to the side-directed second wind forces 92 or **92*a*, for example. Such torsional twisting thus permits the sign panel to pivot laterally as shown in FIG. 7. When the sign panel pivots or twists laterally about said generally vertical axis to a transverse orientation relative to such side-directed winds, the second wind forces, such as 92 or 92*a*, have a force vector component exerted in a sufficiently transverse direction against the sign panel such that the coil springs 16 may resiliently deflect the frame 12 along the above-described predetermined plane, as shown in FIG. 8. The length and flexibility of the unsecured portion of the cross-brace 13 should be sufficient to allow enough torsional twisting of the cross-brace to permit the sign panel to laterally pivot far enough to cause the coil springs 16** to deflect along such predetermined plane before the sign and stand assembly can tip over under the load of the second wind forces.

The exact range of lateral pivotal or swinging motion of the sign 10 depends upon many factors such as sign size, height and weight and coil spring constants, for example. However, a range of lateral pivotal movement through a total arc 96 in FIG. 7 of approximately 10–35 degrees, and most preferably approximately 15 degrees swing to either side of the normal sign orientation 80, has been found to provide satisfactory results. Either smaller or larger ranges of such pivotal sign movement may also be found to be sufficient or necessary in order to provide satisfactory results, depending upon the particular physical constraints present and the particular application of the principles of the invention. It should be realized, however, that such pivotal or swinging movement should not be significantly greater than that necessary to allow deflection of the frame 12 along the above-mentioned predetermined plane in order to prevent the sign from becoming oriented so far askew to oncoming traffic that it cannot be read and observed by such traffic.

Referring to FIG. 5, an alternate preferred embodiment of the present invention includes a stand frame **12*a* generally similar to the stand frame 12 shown in FIG. 4 with the exceptions described below. As an alternative for the torsional twisting of the unsecured portion of the cross-brace 13, it is also possible to allow the cross-brace to pivot or swing freely inside the channels 64*a*, i.e. without any frictional engagement. In this embodiment, as shown in FIG. 5, the channels 64*a* are made sufficiently large to allow the vertical cross-brace 13 to slide easily into the channels without contacting the leg portions 66*a* in order to permit sufficient lateral pivoting of the cross-brace upon application of side-directed wind forces such as 92 and 92*a*, for example. In order to prevent the cross brace 13 from slipping out of the channel when the frame 12 is deflected (as shown in FIG. 8), the hitch pin 53 is inserted through the aperture 58*a* in the cross-brace 13 and through the corresponding aperture 57*a* in the frame 12*a*. Similar to the embodiment shown in FIG. 4 above, two channels 64*a* are preferably provided on opposite sides of the frame 12*a* so that the cross-brace 13** can be inserted in the properly-oriented side (facing the traffic) once the stand is set-up in place.

As discussed above, the hitch pin 53 has a spring-loaded detent means 59, which comprises a spring-loaded ball or sphere resiliently attached to the free end of the hitch pin. This detent means prevents the hitch pin from falling or slipping out of the apertures **58*a* and 57*a* after it is inserted in place. Thus, in order to insert and remove the hitch pin 53, a force must be applied in the pin's axial direction. Chain 55 is attached to the other end of the hitch pin and is in turn attached to the frame 12*a*** in order to prevent the hitch pin from being lost or misplaced.

Referring to FIG. 6, still another alternate preferred embodiment of the invention includes a stand frame **12*b*. In this embodiment, the means for allowing lateral pivotal or swing sign movement is provided by channels 64*b* formed by the channel legs 66*b* and the interconnecting channel bases 68*b*, which have generally arcuate frame-engaging surfaces 70. The spaces between the channel legs 66*b* are sufficiently wider than the thickness of the cross-brace 13 to allow the cross-brace to pivot or swing, as discussed above, about a generally vertical axis as illustrated in FIGS. 7 and 8. As is shown in FIG. 6, however, the corner edges of the cross-brace 13 frictionally engage the arcuate surfaces 70 of the channels 64*b* to frictionally retain the cross-brace 13 and thus the sign 10 in an attached relationship with the frame 12*a*. Thus, the sign 10 may be attached to the frame 12*b* merely by slidably and frictionally inserting the vertical cross-brace 13 into the channels 64*b* on either of the opposite sides of the frame 12*b* such that the cross-brace 13 is frictionally retained therein. Such frictional engagement of the cross-brace 13 and the channel 64*b* is maintained even when the sign 10 pivots laterally about the above-mentioned vertical axis. The hitch pin 53, with its detent means 59 and chain 55 as discussed above, may also be employed in FIG. 6 in connection with the apertures 57*b* and 58*b***, if deemed desirable or advantageous in order to assure retention of the sign.

When the sign panel pivots or swings laterally about said generally vertical axis to a transverse orientation relative to side-directed winds, as discussed above in connection with the embodiments of FIGS. 5 and 6, the second wind forces, such as 92 or **92*a*, have a force vector component exerted in a sufficiently transverse direction against the sign such that the coil spring 16 may resiliently deflect the frames 12*a* and 12*b* along the above-described predetermined plane, as shown in FIG. 8. The width of the channels 64*a* and 64*b*, the distance between the channel bases 68*a* and 68*b*, and the spring constants of the coil springs 16** are selected such that sufficient lateral pivotal movement of the sign occurs to cause or allow the resultant deflection of the frame member to occur before the sign and stand assembly can tip over under the load of the second wind forces.

As was discussed above, the exact range of pivotal movement of the sign depends upon several factors such as sign size and weight and coil spring constants, for example. However a range of pivotal sign movement through a total arc 96 (shown in FIG. 7) of approximately 10–35 degrees, and preferably approximately 15 degrees on either side of the normal sign orientation 80, has been found to provide satisfactory results. Either smaller or larger ranges of pivotal movement may also be sufficient to cause or allow the desired frame deflection, depending upon the particular physical conditions present and the particular application of the principles of the invention. It should be noted, however, that the arcuate surfaces 70 in FIG. 6 preferably both fall upon an imaginary circle 72 (shown in FIG. 6) which has a center located generally midway between the arcuate surfaces 70 and generally midway between the channel legs **66*b*. Such a configuration provides for the desired frictional engagement of the cross-brace 13 with the arcuate surfaces 70** while still allowing the requisite pivotal movement.

As shown and described above, the present invention provides a sign stand having the capability of simple, quick and easy attachment and removal of signs on the sign frame. The present invention also provides a sign attachment means that functions to minimize the possibility of the sign and stand assembly tipping over or sliding to undesired locations in high winds, no matter in which direction the forces of such winds are exerted.

The various parts of the sign and stand assembly are preferably made of aluminum, but may also be made of any other light-weight materials that are strong enough to withstand the forces to which such signs are normally exposed in use.

Although the present invention is described above as being used for flexible or roll-up signs of diamond shapes, it is apparent that the invention may be employed with a wide variety of signs of different materials, rigid or soft and with signs of widely varying sizes and shapes. With rigid signs, however, a flange or protruding member at least functionally similar to the vertical cross-brace 13 should be provided and should be adapted to be inserted as discussed above within the channels 64, 64*a* or 64*b* on either of the opposite sides of the frames 12, 12*a* or 12*b*, respectively. In the embodiment of FIG. 4, however, such a flange or protruding member should have sufficient resilience and flexibility to allow the above-described torsional twisting of its unsecured portion. Also, in order to retain the compactness and relatively small size of the invention for storage and transportation, such rigid signs should also be collapsible or foldable.

The foregoing discussion discloses and describes merely exemplary embodiments of the present invention. One skilled in the art will readily recognize from such discussion that various changes, modifications and variations may be made therein without departing from the spirit and scope of the invention as defined in the following claims.

What is claimed is:

1. A sign and sign stand assembly, wherein said sign and stand include a base, a longitudinally-extending generally upright member, connecting means for connecting said upright member to said base, and attaching means for removably securing said sign to said upright member, said base including a plurality of ground-engaging legs thereon, each of said legs being selectively retractable into a shortened configuration or extendable into an elongated configuration, each of said legs further being pivotal between a first position generally parallel to said upright member and a second position generally perpendicular to said upright member, said base further including resilient biasing means for normally biasingly supporting said upright member in a generally vertical position, said resilient biasing means being resiliently yieldable to allow said upright member to pivotally deflect in a generally downward direction in response to first predetermined forces exerted on said sign, said upright member and said base having a combined overall length approximately equal to the length of said legs when in said shortened configuration, said sign including a foldable sign panel and at least one cross-brace for supporting said foldable sign panel in a generally planar configuration, said attaching means including channel means on said upright member for slidably receiving a first portion of said cross-brace removably inserted therein in order to removably secure said cross-brace thereto in a generally longitudinally-extending disposition thereby displaying said sign on said sign stand, a substantial portion of said longitudinally-extending cross-brace being free of said channel means and substantially unsupported thereby when slidably and removably inserted therein in order to allow said sign panel and at least said substantially unsupported portion of said cross-brace to pivotally swing laterally relative to the axis of said longitudinally-extending upright member in response to second predetermined forces exerted generally parallel to the plane of said sign panel.

2. A sign and sign stand assembly according to claim 1, wherein said channel means on said upright member includes at least a pair of channels on opposite sides of said upright member, thereby allowing said sign to be selectively displayed on either of said opposite sides of said upright member.

3. A sign and sign stand assembly according to claim 1, wherein said first portion of said cross-brace is removably insertable into said channel means of said upright member in a generally laterally fixed frictional engagement therewith, said cross-brace being resilient and sufficiently flexible so that said substantially unsupported portion of said cross-brace can resiliently and torsionally twist laterally in order to allow said sign panel to pivotally swing laterally relative to the axis of said longitudinal upright member in response to said second predetermined forces exerted generally parallel to the plane of said sign panel.

4. A sign and sign stand assembly according to claim 3, further comprising a hitch pin member adapted to be inserted through an aperture in said generally laterally fixed first portion of said cross-brace and through a corresponding aperture in said upright member in order to retain said first portion of said cross-brace in said channel means on said upright member.

5. A sign and sign stand assembly according to claim 1, wherein said first portion of said cross-brace is removably insertable into said channel means of said frame member in a laterally pivotal relationship within said channel means relative to said longitudinal upright member in order to allow said sign panel and said cross-brace to pivot laterally relative to the longitudinal axis of said longitudinal upright member in response to said second predetermined forces exerted on said sign panel.

6. A sign and sign stand assembly according to claim 5, further comprising a hitch pin member adapted to be generally loosely inserted through a relatively large aperture in said first portion of said cross-brace and through a corresponding aperture in said upright member in order to retain said first portion of said cross-brace in said channel means on said upright member.

7. A sign and sign stand assembly according to claim 5, wherein said channel means comprises at least a pair of spaced-apart generally aligned channels on said upright member, each of said channels being generally U-shaped in lateral cross-section and having a pair of spaced-apart leg portions for insertably receiving said first portion of said cross-brace in the open space therebetween, each of said pair of channels having said open spaces between its associated leg portions facing generally toward one another, said leg portions of each of said U-shaped channels being sufficiently spaced from one another to allow said first portion of said cross-brace to laterally pivot between said leg portions about a generally longitudinally-extending axis in order to allow said pivotally swinging lateral movement of said sign panel, each of said pair of U-shaped channels further having a channel base portion with a generally arcuate surface thereon for frictionally engaging said first portion of said cross-brace when said first portion is insertably received between said leg portions, said first portion of said cross-brace slidably engaging said arcuate surfaces during said lateral pivoting between said leg portions.

8. A sign and sign stand assembly stand according to claim 5, wherein said channel means comprises at least a pair of spaced-apart generally aligned channels on said upright member, each of said channels being generally U-shaped in lateral cross-section and having a pair of spaced-apart leg portions for receiving said first portion of said cross-brace in the open space therebetween, said leg portions of each of said U-shaped channels being sufficiently spaced from one another so that said first portion of said cross-brace is allowed to laterally pivot between said leg portions about a generally longitudinally-extending axis in order to allow said pivotal lateral movement of said sign panel when said first portion of said cross-brace is removably inserted into said U-shaped channels.

9. A sign and sign stand assembly stand according to claim 8, further comprising a hitch pin member adapted to be generally loosely inserted through an aperture in said first portion of said cross-brace and through a corresponding aperture in said upright member in order to retain said first portion of said cross-brace in said channels on said upright member.

10. A stand for displaying a sign, said sign having a flexible sign panel and at least one generally vertical cross-brace thereon, said stand comprising a stand base, an upstanding frame member, and connecting means for mounting said frame member on said stand base, said stand base including a plurality of ground-engaging means, each of said ground-engaging means being selectively retractable into a shortened configuration and selectively extendable into an elongated configuration, each of said ground-engaging means further being pivotal between a first position generally parallel to said frame member and a second position generally perpendicular to said frame member, said frame member including sign attachment means for releasably attaching said cross-brace to said frame member in order to display said sign thereon, said connecting means including spring means for normally supporting said frame member in a generally vertical position, said spring means resiliently permitting said frame member to deflect relative to said stand base generally along a predetermined plane in response to first wind forces exerted generally transverse to the plane of said sign when said sign is displayed on said frame member, said sign attachment means including a pair of spaced-apart generally aligned channels on said frame member, said channels being generally U-shaped in lateral cross-section and being located on said frame member so that the plane of said sign panel is generally perpendicular to said predetermined plane when a portion of said cross-brace is insertably secured between the leg portions of both of said U-shaped channels, said sign attachment means further including means for permitting said sign panel to pivotally swing laterally about a generally vertical axis in response to second wind forces exerted generally parallel to the plane of said sign panel, said laterally pivoted sign panel being orientated generally transverse relative to said second wind forces in order to permit said frame member to deflect generally along said predetermined plane, said cross-brace being generally vertically disposed, each of said U-shaped channels having a channel base portion with a generally arcuate surface thereon, said channels being adapted to receive said cross-brace therebetween in a frictional engagement with said arcuate surfaces, said arcuate surfaces further being configured to allow said lateral pivotal movement of said cross-brace while in said frictional engagement therewith in order to allow said pivotally swinging lateral movement of said sign panel.

11. A stand according to claim 10, wherein said sign attachment means comprises a pair of said channels on each of a pair of opposite sides of said frame member, said arcuate surfaces being located on said frame member so that the plane of said sign panel is generally perpendicular to said predetermined plane when said sign is attached to either of said sides of said frame member such that said cross-brace is midway in a position generally between the edges of the corresponding arcuate surfaces.

12. A sign and stand for displaying said sign, said sign including a sign panel composed of a foldable and flexible material and a pair of cross-braces for supporting said sign panel in a generally planar configuration, said cross-braces being pivotally interconnected about a laterally-extending axis for pivotal relative movement between a first position generally aligned and parallel with one another and a second position generally perpendicular to one another for supporting said sign panel in said generally planar configuration, said stand including a stand base assembly and a longitudinally-extending generally upstanding frame member secured to said stand base assembly, said stand base assembly including a plurality of outwardly and inwardly telescoping legs, each of said legs further being pivotable between a first position generally parallel and adjacent to said upstanding frame member and a second position generally perpendicular to said upstanding frame member, said upstanding frame member including a pair of spaced-apart generally longitudinally elongated channels on each of two opposite sides thereof, each pair of said channels having a generally U-shaped lateral cross-section and being adapted to receive a first portion of one of said cross-braces slidably and removably inserted therebetween in a generally longitudinal-extending disposition when said cross-braces are in said second position, a substantial portion of said longitudinally-extending cross-brace being free of said channels and being substantially unsecured thereby when slidably and removably inserted therebetween in order to allow said sign panel and at least said substantially unsecured portion of said cross-brace to pivot laterally relative to the longitudinal axis of said longitudinally-extending upstanding member in response to first predetermined forces exerted generally parallel to the plane of said sign panel.

13. A sign and stand according to claim 12, wherein said stand base assembly further includes spring means for normally supporting said longitudinally-extending generally upstanding frame member in a generally vertical position, said spring means resiliently permitting said upstanding frame member to deflect relative to said stand base assembly generally along a predetermined longitudinally-extending plane, said U-shaped channels on each of said opposite sides of said upstanding frame member being located and configured such that the plane of said sign panel is generally perpendicular to said predetermined plane when said sign is displayed on either of said opposite sides of said frame member, said deflection of said frame member occurring in response to second forces exerted generally transversely to the plane of said sign panel when said sign is displayed on said frame member.

14. A sign and stand according to claim 13, wherein said telescoping legs include detent means for releasably holding said legs in an outwardly telescoped positions.

15. A sign and stand according to claim 14, wherein said upstanding frame member and said stand base assembly have a combined overall length approximately equal to the length of said inwardly telescoped legs when said legs are pivoted to said first position generally parallel and adjacent to said upstanding frame member.

16. A sign and stand according to claim 15, wherein said upstanding frame member is extruded from aluminum, said U-shaped channels being extruded integrally therewith.

17. A sign and stand according to claim 13, wherein said first portion of said one of said cross-braces is removably insertable between either of said pairs of channels in a generally laterally fixed engagement therewith, said one cross-brace being resilient and sufficiently flexible that said unsecured portion of said one cross-brace can resiliently and torsionally twist laterally in order to allow said sign panel to pivot laterally relative to the longitudinal axis of said longitudinally-extending frame member in response to said first predetermined forces exerted generally parallel to the plane of said sign panel, said laterally pivoted sign panel being oriented generally transverse relative to said second forces in order to cause said upstanding frame member to deflect along said predetermined plane.

18. A sign and stand according to claim 17, further comprising a hitch pin member adapted to be inserted through an aperture in said generally laterally fixed first portion of said one cross-brace and through a corresponding aperture in said upstanding frame member in order to retain said first portion of said cross-brace in said attached relationship with said upstanding frame member.

19. A sign and stand according to claim 17, wherein each of said pairs of said channels includes means for permitting said one cross-brace and said sign panel to pivot laterally relative to the longitudinal axis of said longitudinally-extending upstanding frame member in response to said first predetermined forces exerted generally parallel to the plane of said sign panel, said laterally pivoted sign panel being oriented generally transverse relative to said second forces in order to cause said upstanding frame member to deflect along said predetermined plane.

20. A sign and stand according to claim 19, further comprising a hitch pin member adapted to be generally loosely inserted through a relatively large aperture in said one cross-brace and through a corresponding aperture in said upstanding frame member in order to retain said one cross-brace between the pair of said channels into which it has been inserted.

* * * * *

UNITED STATES PATENT AND TRADEMARK OFFICE

CERTIFICATE OF CORRECTION

PATENT NO. : 4,548,379

DATED : Oct. 22, 1985

INVENTOR(S) : James R. Seely and Cecil E. Ursprung

It is certified that error appears in the above-identified patent and that said Letters Patent is hereby corrected as shown below:

References Cited: "12/1969 Carlson" should be --12/1967 Carlson--

Column 1, line 34; "stuck" should be --struck--

Column 1, line 49; "4,256,040" should be --4,265,040--

Column 4, line 48; "ina" should be --in a--

Column 5, line 14; insert --in-- after "shown"

Column 10, line 59; delete "stand" (second occurrence)

Signed and Sealed this

*Eighth* Day of *July 1986*

[SEAL]

*Attest:*

DONALD J. QUIGG

*Attesting Officer*

*Commissioner of Patents and Trademarks*